Figure 1:
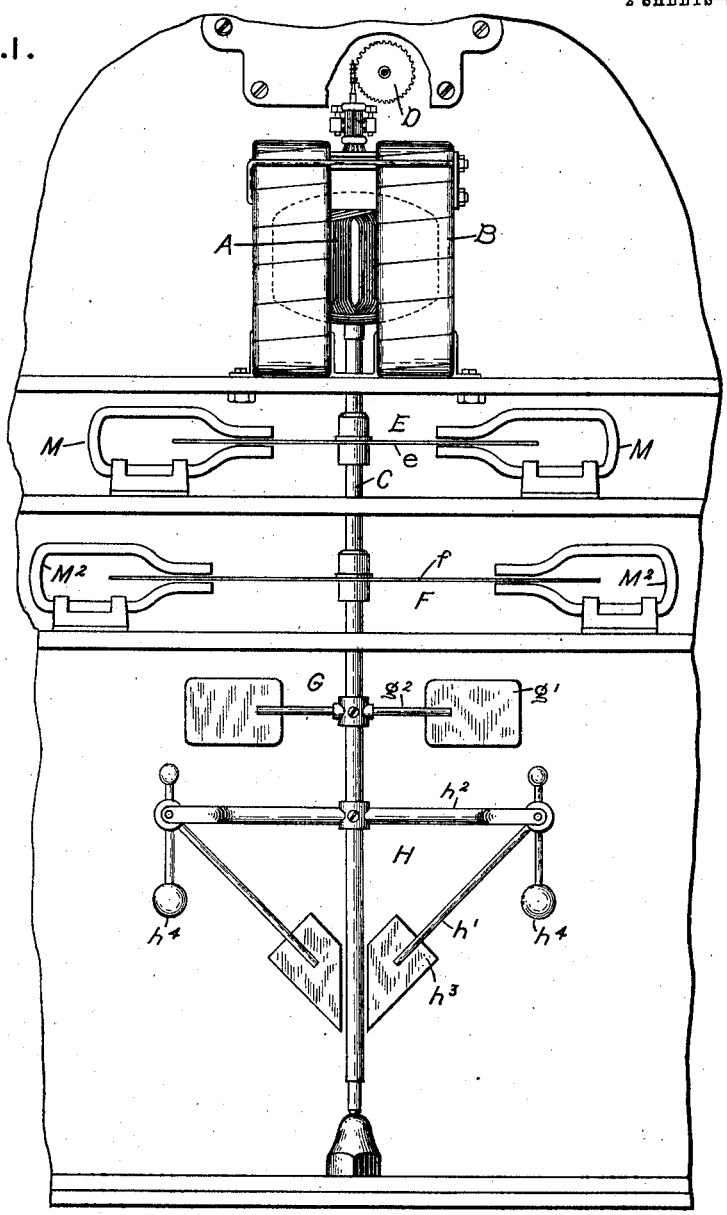

W. H. PRATT.
VARIABLE RATE METER.
APPLICATION FILED APR. 18, 1903.

1,003,506.

Patented Sept. 19, 1911.
2 SHEETS—SHEET 1.

Witnesses:

Inventor,
William H Pratt,
By _____
Att'y.

W. H. PRATT.
VARIABLE RATE METER.
APPLICATION FILED APR. 18, 1903.

1,003,506.

Patented Sept. 19, 1911.

2 SHEETS—SHEET 2.

Witnesses:
George H. Tilden
Helen Oxford

Inventor
William H Pratt
By Albert S Dun
Att'y

COLUMBIA PLANOGRAPH CO., WASHINGTON, D. C.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

VARIABLE-RATE METER.

1,003,506.    Specification of Letters Patent.   Patented Sept. 19, 1911.

Application filed April 18, 1903. Serial No. 153,208.

*To all whom it may concern:*

Be it known that I, WILLIAM H. PRATT, a citizen of the United States, residing at Lynn, county of Essex, State of Massachusetts, have invented certain new and useful Improvements in Variable-Rate Meters, of which the following is a specification.

The object of my present invention is the production of a measuring instrument which shall automatically vary its rate of recording in a predetermined manner as the quantity to be measured varies.

More particularly the object of my invention is the production of a measuring instrument in which the rate changing means are controlled by the instrument itself.

In the ordinary integrating instrument such as the electric motor meter, as is well known the torque or the moment of the force tending to turn the movable element of the meter, is proportional to the instantaneous value of some function of the quantity to be measured. This torque acting upon the armature of the motor meter gives it a certain velocity, the velocity given being determined by the force or forces resisting the motion of the element. The amount of movement, which is equivalent to the product of the time during which the force acts, multiplied by the average velocity, is proportional to the total consumptioin of energy, current, or the like. In the ordinary operation of a meter of this character, the price to be paid for the energy or current consumed, or the like, is calculated by multiplying the total reading by a certain unit of price, that is to say by multiplying the product of the velocity and time by the unit of price. It will at once be understood that by suitably proportioning the movement given to the indicating mechanism by the moving element of the meter, the indications given by the meter can be made in dollars and cents instead of watts, ampere hours, or the like. It will also be understood that the readings in dollars and cents can be obtained without altering the gearing connecting the moving element of the meter with the indicating mechanism if the velocity of the moving element be changed in the proper manner. This velocity may be changed by altering the forces resisting the movement of the moving element. If these forces are merely varied in kind the theoretical effect is exactly the same as that produced by changing the ratio of speed transmission between the moving element of the meter and the indicating mechanism. If, however, the character of the resisting forces as well as their quantities be changed, the effect will be to give indications proportional to the product of the watt or ampere hours multiplied by prices which vary with different rates of consumption. This principle I have utilized in the construction of a variable rate meter.

In the meter forming the subject matter of my present invention, I employ a plurality of devices for exerting retarding forces obeying different laws to resist the movement of the moving element of the meter. In the ordinary electric meter the retarding force is produced by the movement of a non-magnetic conductor through a magnetic field. This force varies approximately with the speed with which the conductor is moved through the magnetic field. When a hysteretic magnetic element is moved through a magnetic field, the resisting force is approximately constant and independent of the speed. When the resisting force is produced by the movement of a series of vanes against the air, the resistance is approximately proportional to the square of the speed and if at the same time at which the speed increases the area of the air vanes or their effective areas be increased the resistance is proportional to higher powers of the speed than the square. By utilizing two or more of these or other resisting forces having different laws, I am enabled to obtain a meter giving indications corresponding to rates which vary according to a predetermined law, and by varying the values and combinations of these forces, meters may be obtained having rate factors which vary according to almost any desired law.

For a better understanding of my invention, reference may be had to the accompanying drawings in which I have illustrated several embodiments of my invention.

Figures 1, 2, 3 and 4, are elevations showing motor meters, the shafts of which carry retarding devices. The arrangement of the retarding devices shown in each figure differs from that shown in the other figures.

In all the figures of the drawings, A represents the armature of a motor meter, and B represents the field coils of the meter. The armature is mounted upon a shaft C. The upper end of the shaft is provided with a worm which engages with the gear D of the indicating mechanism. In the construction shown in Fig. 1, the armature shaft is acted on by retarding devices E, F, G and H. The retarding element E comprises a disk $e$ of hysteretic magnetic material such as iron, which may be divided to make the eddy currents negligible, and which rotates between the poles of magnets M. The resistance to the rotation of the shaft C produced by the movement of the disk $e$ between the poles of the magnets M is determined by the size of the parts and their arrangement and by their magnetic properties and is constant for a given construction and independent of the speed of rotation. The retarding device F comprises a disk $f$ of nonmagnetic conducting material such as copper or aluminum turning between the poles of magnets $M^2$. As is well known, the resistance to the rotation of the shaft C produced by the interaction between the disk $f$ and the magnets $M^2$, varies directly with the speed of rotation. The amount of the resistance at a given speed is determined by the dimensions, arrangement and physical properties of the disk and magnets and may be varied by changing any of these features. The retarding device G consists of a plurality of vanes or blades $g'$ carried by a radial arm $g^2$. The resistance to the rotation of the shaft C at ordinary speeds produced by the action of the air against these vanes varies with the square of the velocity of rotation and is determined in amount by the size and shape of the vanes and by their distance from the armature shaft. The retarding device H consists of a plurality of elements $h'$ pivotally connected to radial arms $h^2$ carried by the shaft C. The elements $h'$ have rigidly connected to them one or more vanes $h^3$ and weights $h^4$. In the construction shown in Fig. 1, the vanes and weights are so arranged with respect to one another that the vanes are held adjacent to the shaft in the position of rest. As the shaft is rotated, however, the centrifugal force acting upon the elements $h'$ moves the vanes away from the shaft. As a result the retardation due to the device H varies with powers of the velocity of rotation higher than the second power. The quantity of the retarding force at a given speed and its rate of variation is affected by the arrangement and dimensions of the parts. The variation in the retarding effect occurring with a change in velocity is affected by the distance which that change in velocity moves the vanes away from the shaft C. If the vanes are arranged so that the centrifugal force acting upon the element $h'$ tends to move the vanes toward the shaft instead of away from it, the effect is a retardation varying less rapidly than the square of the velocity. The total retarding force acting upon the shaft C at any given speed and its law of variation with respect to the speed can be made to vary in an indefinite number of ways by different arrangements and proportions of the retarding devices E, F, G and H as shown in Fig. 1.

Figure 2:
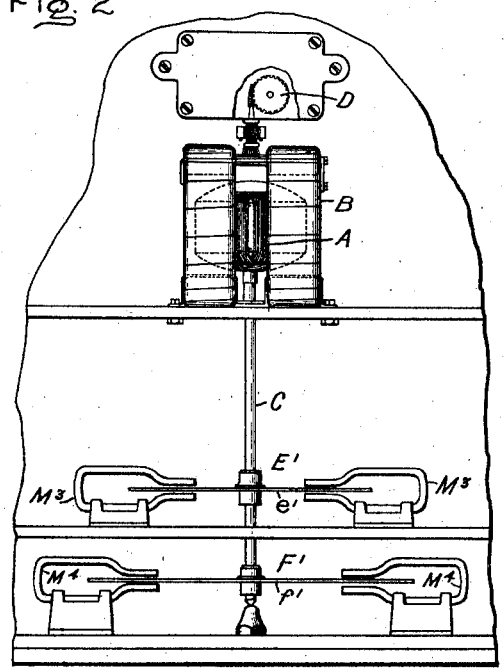

In Fig. 2 I have illustrated a modification of the general scheme disclosed in Fig. 1 in which the armature shaft C carries two retarding devices E' and F' similar to the retarding devices E and F of Fig. 1. Since the retardation produced by the interaction between the disk $e'$ formed of hysteretic magnetic material with the magnets $M^3$ is constant, the armature shaft C will not begin to rotate until a certain minimum amount of current, energy consumption or the like, takes place. This amount must be sufficient to produce a torque upon the armature shaft which will balance that produced by E'. When the torque from the armature shaft becomes great enough to cause it to rotate, the total retarding force acting on the shaft will be the combination of the constant force due to the retarding device E' with the retarding force produced by the interaction of the copper disk F' and the magnets $M^4$, the latter varying directly with the speed. The result will be that the velocity of rotation will be proportional to the total torque less an amount equal to the torque exerted by the retarding device E'. As a result the meter will only measure the excess of current, or the like, over that necessary to overcome the retarding device E'.

Figure 3:
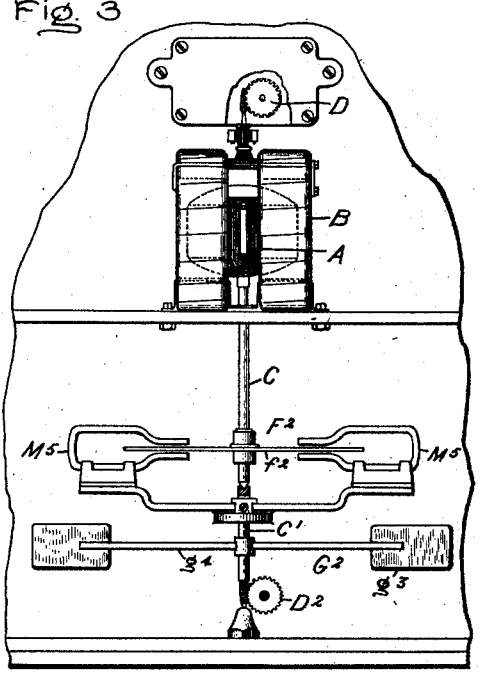

In the construction shown in Fig. 3, the movement of the armature shaft C is retarded by the devices $F^2$ and $G^2$. The retarding device $F^2$ comprises a disk of conducting material $f^2$ carried by the shaft C and turning between the poles of magnets $M^5$. The magnets $M^5$ are carried by a shaft C' in alinement with the shaft C. In addition to the magnets $M^5$ the shaft C' carries the retarding device $G^2$ which is composed of a series of retarding vanes $g^3$ carried by arms $g^4$. The shaft C' engages with a gear $D^2$ of an auxiliary indicating mechanism. As the driving torque exerted by the shaft C upon the shaft C' must equal the retarding torque on the shaft C exerted by the shaft C', the retarding action upon the shaft C' exerted by the vane $g^3$ must be equal to the retarding action upon the shaft C exerted by the device $F^2$. Consequently the auxiliary indicating mechanism of which the wheel $D^2$ is an element, will give readings proportional to the square root of the speed with which the shaft C moves since the retarding action of the vanes $g^3$ varies directly with the square of the velocity of rotation. It is readily susceptible of mathematical demonstration that the velocity of rotation of the shaft C indicated by D will be equal to $$ax + b\sqrt{x},$$

where $a$ and $b$ are constants and $x$ represents the watts or other quantity to be measured by the meter.

Figure 4:
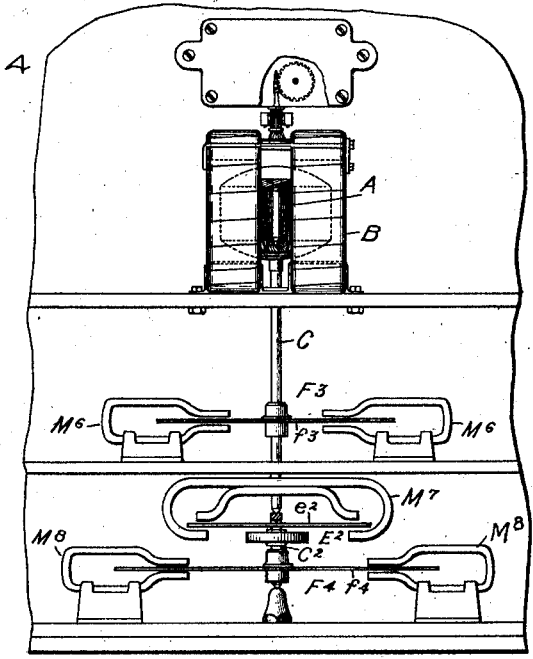

In the construction illustrated in Fig. 4, I have shown a typical arrangement for producing a sudden change in the rate when the load exceeds a certain value. In this arrangement a shaft $C^2$ is placed in alinement with the main shaft C. The shaft C carries a disk $f^3$ of conducting material which interacts with the fixed magnets $M^6$ to form the retarding device $F^3$. The shaft $C^2$ carries the conducting disk $f^4$ of a retarding device $F^4$, the magnets $M^8$ for which are fixed with respect to the disk. The shaft $C^2$ also carries a disk $e^2$ of hysteretic magnetic material which coöperates with magnets $M^7$ carried by the shaft C to form the retarding device $E^2$. At lower speeds of the shaft C the retarding torque exerted by the device $F^4$ will be insufficient to overcome the torque exerted between the disk $e^2$ and the magnets $M^7$ and the shafts C and $C^2$ will turn together. The total retarding action upon the shaft C will then be that due to the joint action of the devices $F^3$ and $F^4$. The speed will therefore vary with the torque and will be inversely proportional to the sum of the retarding effects of $F^3$ and $F^4$. At higher speeds however the torque exerted by the device $F^4$ will become equal to the torque exerted by the device $E^2$ whereupon relative movement between the disk $e^2$ and the magnets $M^7$ takes place. At speeds of the shaft C above the critical speed at which this takes place, the shaft $C^2$ will turn at a constant speed and the total retarding action upon the shaft C will be that due to the retarding device $F^3$ which varies with the speed plus a constant retarding torque which is that of the device $E^2$. The result will be that the speed of rotation of the shaft C above the speed at which $C^2$ and C cease to turn together will be proportional to the difference between the total torque and the retarding torque due to the device $E^2$ and will be inversely proportional to the retarding effect of $F^3$.

It will be understood of course that the friction between the moving and fixed parts of the meter produces a retarding action in addition to that produced by the retarding devices which I have hereinbefore described, but this may be made so small in comparison with that due to the retarding devices described that it may be neglected.

While I have described somewhat in detail several embodiments of my invention, I do not wish my claims to be limited by such description more than is required by the state of the art, as I believe that I am the first to vary the rate at which a meter records by combining a plurality of devices, exerting retarding forces upon the movable element of the meter, which bear different relations to the speed of movement of said movable element.

What I claim as new and desire to secure by Letters Patent of the United States, is,

1. A multi-rate meter comprising in combination a moving element, and means controlled by the movement of the element for producing a sudden change in the rate of movement of the element relative to the load as the load on the meter changes.

2. A multi-rate meter comprising in combination a moving element and a pair of retarding devices therefor, one of said retarding devices consisting of a conducting element made out of non-magnetic material, turning in a magnetic field, and the other of said devices consisting of a mass of magnetic material turning in a magnetic field.

3. A multi-rate meter comprising in combination a rotating shaft and a pair of retarding devices carried thereby, one of said retarding devices comprising a conducting non-magnetic element turning in a magnetic field, and the other of said retarding devices comprising a magnetic element turning in a magnetic field.

4. A measuring instrument comprising in combination a rotatable element, and a plurality of devices for exerting retarding forces on the movable element and thereby governing its speed, one of said retarding devices being independent of the speed and another of said retarding devices exerting a force proportional to the speed of the movable element.

5. A measuring instrument comprising in combination, a movable element, retarding devices acting thereon to regulate the speed of said movable element produced by a given load, and thereby the rate of recording, said retarding devices being arranged to cause the meter to record at one rate for loads not exceeding a predetermined value and at a different rate for those exceeding said value.

In witness whereof, I have hereunto set my hand this 15th day of April, 1903.

WILLIAM H. PRATT.

Witnesses:
DUGALD McK. McKILLOP,
JOHN A. McMANUS.